(12) United States Patent
Yasaki et al.

(10) Patent No.: US 7,295,367 B2
(45) Date of Patent: Nov. 13, 2007

(54) OPTICAL ELEMENT, OPTICAL APPARATUS, FILM FORMING METHOD, FILM FORMING APPARATUS AND DEVICE FABRICATION METHOD

(75) Inventors: Yoichi Yasaki, Tochigi-ken (JP); Keisui Banno, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 11/144,168

(22) Filed: Jun. 3, 2005

(65) Prior Publication Data

US 2005/0270636 A1 Dec. 8, 2005

(30) Foreign Application Priority Data

Jun. 3, 2004 (JP) ............... 2004-166290

(51) Int. Cl.
*G02B 5/20* (2006.01)
(52) U.S. Cl. .................................... 359/359
(58) Field of Classification Search ............... None
See application file for complete search history.

(56) References Cited

U.S. PATENT DOCUMENTS

2002/0035024 A1* 3/2002 Kato ........................ 501/53

FOREIGN PATENT DOCUMENTS

| JP | 11-223707 | 8/1999 |
| JP | 2001-279437 | 10/2001 |

OTHER PUBLICATIONS

English Abstract of Japanese Patent Publication No. 1-223707.
English Abstract Japanese Patent Publication No. 2001-279437.

* cited by examiner

*Primary Examiner*—Stephone B. Allen
*Assistant Examiner*—Lee Fineman
(74) *Attorney, Agent, or Firm*—Morgan & Finnegan, LLP (57) ABSTRACT

An optical element includes a multilayer film, and a substrate, wherein the multilayer film includes a first thin film that is formed on the substrate, and made of fluorine-doped oxide or nitride, and a second thin film that is formed on the first thin film, and made of a fluoride material.

16 Claims, 6 Drawing Sheets

OPTICAL ELEMENT, OPTICAL APPARATUS, FILM FORMING METHOD, FILM FORMING APPARATUS AND DEVICE FABRICATION METHOD

BACKGROUND OF THE INVENTION

The present invention relates generally to an optical element in which an optical thin film is formed on a substrate, an optical apparatus, a film forming method, a film forming apparatus, and a device fabrication method, and more particularly to an optical element that includes a multilayer film made of fluorine is formed by sputtering, an optical apparatus, a film forming method, a film forming apparatus, and a device fabrication method.

Along with the recent demands on finer processing and improved economical efficiency, the further improvement of resolution and productivity of the projection exposure apparatus has been increasingly required. Use of a light source having a short wavelength is one method of improving the resolution. Recently, the practical use of a stepper starts which uses an excimer laser that oscillates light with wavelength shorter than a mercury lamp and is high-power as light source. An optical element in the stepper should form an optical thin film (antireflection film etc.) to reduce the light intensity loss by the surface reflection of a substrate etc.

In general, an optical element used for the light with a wavelength that is shorter than 400 nm is likely to cause, if its optical thin film is composed of a film material with a large light absorption factor or a film material with low laser durability, a light intensity loss by absorption, a substrate surface deformation and a film destruction by the heat absorption. Therefore, the optical thin film uses a film material with a low absorption factor of light and high laser durability, for instance, calcium fluoride such as magnesium fluoride ($MgF_2$), lanthanum fluoride ($LaF_3$), aluminum fluoride ($AlF_3$), gadolinium fluoride ($GdF_3$) and neodymium fluoride ($NdF_3$). The substrate uses fluorine compound crystal such as calcium fluoride and quartz glass etc. A forming method of the film on the optical element is chiefly classified into an evaporation system and a sputter system. The evaporation system includes a vacuum vapor deposition, a molecular beam vapor deposition, and an ion plating and ion beam vapor deposition. The evaporation system evaporates a material (fluorine) that composes the thin film by heating, is coagulated on the substrate surface with a temperature that is lower than an evaporation temperature, and forms a fluoride thin film. The sputter system includes various methods, such as a conventional sputtering, a magnetron sputtering, an ion beam sputtering and ECR sputtering, ionizes the atoms and the molecules introduced into the chamber by the discharge, collides them with the target with high energy, springs the atoms out of the target surface, deposits the sprung atoms on the optical element (substrate), and forms a fluoride thin film (see, for example, Japanese Patent Application Publication No. 2001-279437 and Japanese Patent Application, Publication No. 11-223707).

However, these film forming methods make the temperature of the optical element to a high temperature, and deform the substrate surface. Therefore, a stress is caused between the substrate and the thin film such as fluoride thin film with a thermal expansion coefficient different from a thermal expansion coefficient of the substrate, and the thin film is exfoliated. Moreover, the film forming method of the sputter system makes fluoride by a chemical reaction of a metallic material (magnesium (Mg), lantern (La), aluminum (Al), and neodymium (Nd), etc.) as the target on the substrate. In this case, more gases including $F_2$, $H_2O$, and $H_2$ are introduced than the film forming method of the evaporation system into the film forming chamber to unit a dangling bond. Moreover, in this case, even if $H_2O$ or $H_2$ is not intentionally introduced into the camber, $H_2O$ or $H_2$ is generated from an inner wall of the chamber etc. by discharging in the chamber. When the quartz etching, chemical species that derived from resultant fluorine or hydrofluoric acid is sandwiched in the interface between the film and substrate, an adhesion between the substrate and the film deteriorates and the thin film is likely to peel off. Moreover, the fluoride thin film that has a columnar film structure easily absorbs moisture in the atmospheric, and the moisture reacts with uncombined fluorine is sandwiched near the interface between substrate and the film and corrode the quartz substrate. Therefore, the film is likely to peel off. As a result of the film exfoliation, the optical element sometimes cannot satisfy the designed optical performance.

BRIEF SUMMARY OF THE INVENTION

Accordingly, it is an exemplified object of the present invention to provide an optical element that improves both of the resolution and the productivity, an optical apparatus, a film forming method, a film forming apparatus, and a device manufacturing method.

An optical element of one aspect according to the present invention includes a multilayer film, and a substrate, wherein the multilayer film includes a first thin film that is formed on the substrate, and made of fluorine-doped oxide or nitride, and a second thin film that is formed on the first thin film, and made of a fluoride material.

An optical apparatus that includes the above optical element, an exposure apparatus that includes the above optical element and uses the exposure light of 400 nm or smaller, a device manufacturing method that includes the steps of exposing an object using the above exposure apparatus, and developing the exposed object also constitute another aspect of the present invention.

A method according to another aspect of the present invention of manufacturing an optical element that has a multilayer film on a substrate includes the step of forming the multilayer film onto the substrate by sputtering, wherein the forming step includes the steps of introducing into a chamber that accommodates the substrate a gas that contains nitrogen or oxygen, and fluorine that whose content is controlled to 10% or less relative to the gas in the chamber, and forming a first thin film onto the substrate, and forming a second thin film onto the first thin film by introducing a gas that contains fluorine into the chamber. A film forming apparatus that includes a gas flow sensor that controls a flow of the gas that contains fluorine in the above method to a predetermined value also constitutes another aspect of the present invention.

Other objects and further features of the present invention will become readily apparent from the following description of the preferred embodiments with reference to accompanying drawings.

DETAILED DESCRIPTION OF THE PREFERRED EMBODIMENTS

Figure 1:
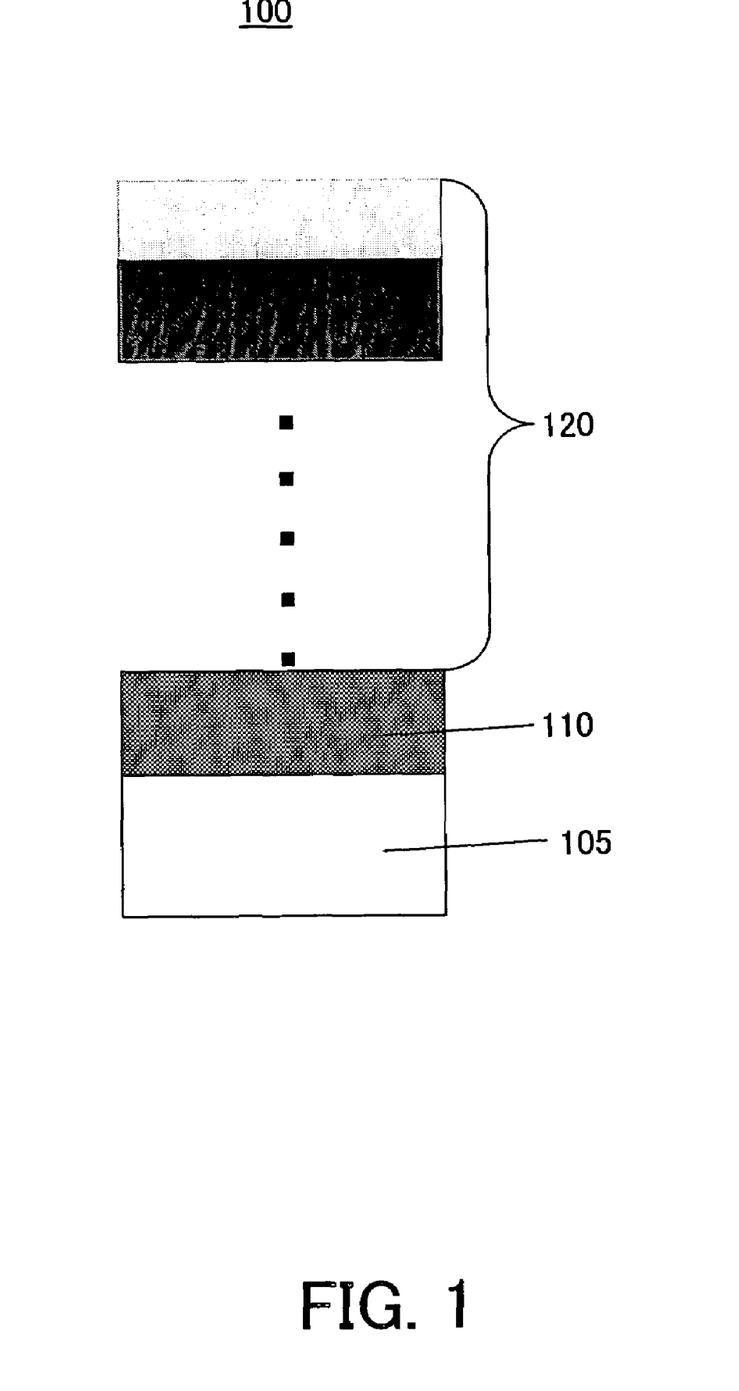
FIG. 1 is a schematic partially enlarged sectional view of an optical element having a multilayer film of the present invention.

A description will now to be given of an optical element of one aspect according to the present invention. FIG. 1 is a partially enlarged sectional view of an optical element 100.

The optical element is used to transmit a light with a wavelength that is shorter than 400 nm, and includes a substrate 105, a first thin film 110, and a second thin film 120. The instant embodiment uses a lens as the optical element 100, but may use a diffractive grating and a prism.

The substrate 105 is used to transmit a light with a wavelength that is shorter than 400 nm. The first thin film 110 and the second thin film 120 are formed on a surface of the substrate 105. A third thin film, a fourth thin film, and a fifth thin film may be formed beside the first thin film 110 and the second thin film 120, but are omitted to simplify the explanation.

The substrate 105 is made of such a material as quartz glass and calcium fluoride, which transmits a light of a ultraviolet region, and has almost an ellipse section. The substrate 105 shown in FIG. 1 has an approximately partially enlarged rectangular shape, but actually it has an approximately elliptical section. Moreover, the substrate 105 is not limited to this shape, and may be a flat plate shape, aspheric shape, and polygonal shape.

The first thin film 110 prevents an exfoliation between the substrate 105 and the second thin film 120. The first thin film 110 is formed as an approximately arc shape on the surface of the substrate 105, and made of fluorine-doped oxide or nitride. A material of the first thin film 110 may use, for example, aluminum oxide ($Al_2O_3$), magnesium oxide (MgO), lanthanum oxide ($La_2O_3$), neodymium oxide ($Nd_2O_3$), yttrium oxide ($Y_2O_3$), aluminum nitride (AlN), silicon nitride ($Si_3N_4$), titanium oxide ($TiO_2$), and tantalum oxide ($Ta_2O_5$). The material that contains oxide or nitride does not generate fluorine or hydrogen plasma in the film forming process, and does not generate chemical species that etches the surface of the substrate 105. Therefore, no chemical species that etches the substrate 105 exist in the interface between the surface of the substrate 105 and the first thin film 110. After the first thin film 110 is formed, a good adhesion between the first thin film 110 and the substrate 105 prevents the first thin film 110 from easily peeling off from the substrate 105.

Although oxide and nitride have good adhesion to the substrate 105, they have such high film absorption factors that the throughput lowers. On the other hand, the material consisting of fluoride has a low film absorption factor but the bad adhesion. Accordingly, the present inventors have considered their advantages and the disadvantages, and discovered oxide or nitride doped with fluorine of 15% or less exhibited good performance. Thereby, the film absorption factor of the first thin film to the light with a wavelength of approximately 193 nm becomes 0.2% or less per the film thickness of 100 nm.

As a result, the substrate 105 that has the first thin film 110 can prevent the reduced optical performance such as reflection, due to film is peeling off etc.

The first thin film 110 preferably has a thickness a of 2 nm or more to maintain a high adhesion between the substrate 105 and the second thin film 120.

The second thin film 120 transmits or reflects a light with a specific wavelength. The second thin film 120 is formed as an approximately arc shape on a surface of the first thin film 110, and made of fluoride. A material of the second thin film 120 may use, for example, magnesium fluoride ($MgF_2$), aluminum fluoride ($AlF_3$), gadolinium fluoride ($GdF_3$), yttrium fluoride ($YF_3$), lanthanum fluoride ($LaF_3$), neodymium fluoride ($NdF_3$), lead fluoride ($PbF_2$), and strontium fluoride ($SrF_2$). Since the material that consists of fluoride has a lowered light absorption especially on the film, decreases a light intensity loss, and improves the throughput and productivity. Moreover, the second thin film 120 does not decrease the optical performance by the film exfoliation, and improves the throughput.

Figure 2:
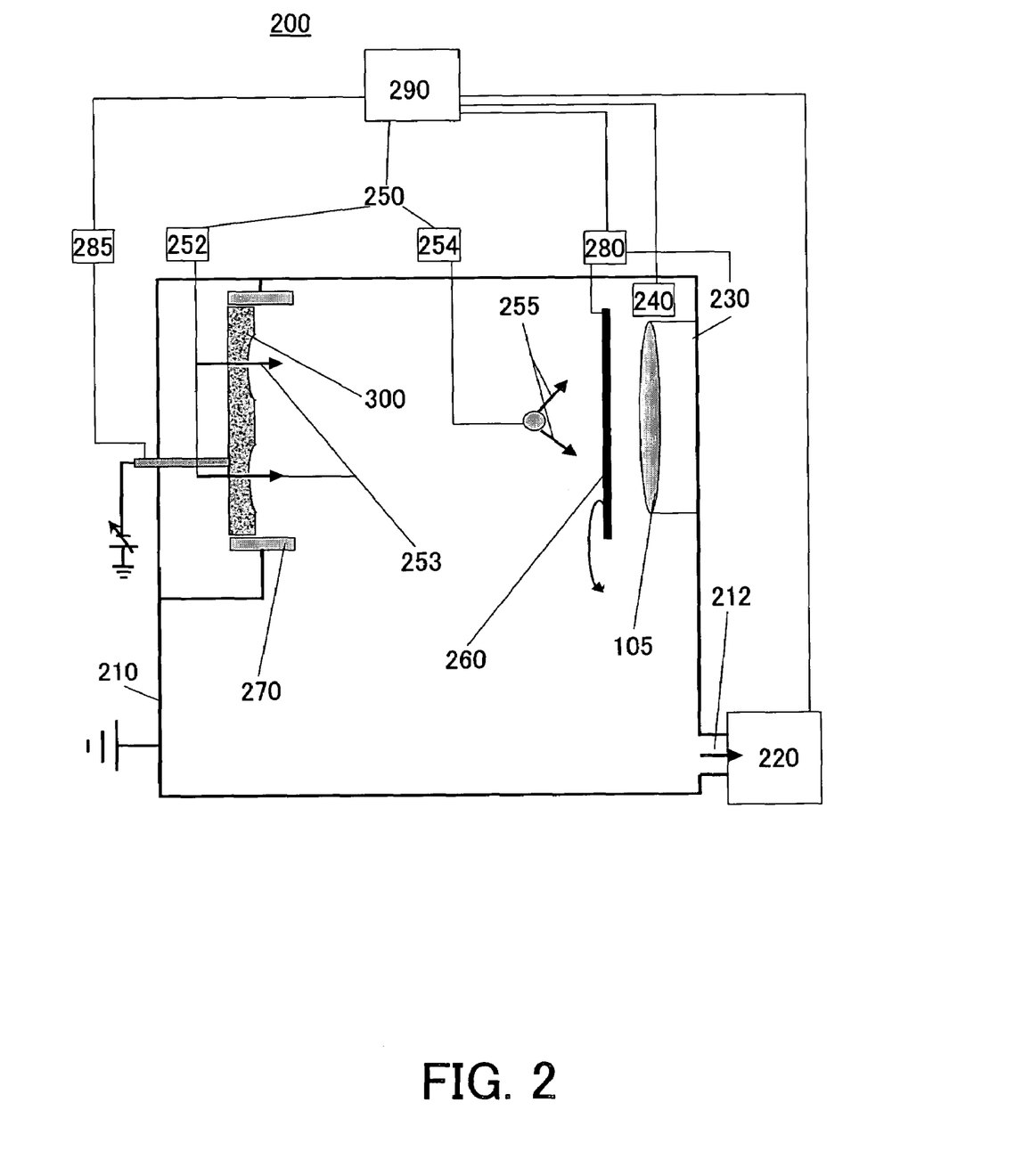
FIG. 2 is a schematic sectional view of a film forming apparatus that fabricates the optical element of the present invention shown in FIG. 1.

Referring now to FIG. 2, a description will be given of a film forming apparatus 200. Here, FIG. 2 is a sectional view of the film forming apparatus 200.

The film forming apparatus 200 forms a multilayer film onto the substrate 105, and includes a chamber 210, an exhaust part 220, a substrate holder 230, a film thickness meter 240, a gas introducing mechanism 250, a shutter 260, a shield 270, a driving part 280, a power supply part 285, and a controller 290. The film forming apparatus 200 of the instant embodiment uses sputtering, but may use a film forming apparatus of the evaporation system.

The chamber 210 accommodates the substrate holder 230, the substrate 150 held by the substrate holder 230, and the shutter 260, and is maintained in a predetermined pressure environment. The chamber 210 needs to use a material that emits and transmits the gas little, and is generally made of stainless steels or nickel-plated mild steel. The chamber 210 has an exhaust port 212 that connects to the exhaust part 220 described later, and is a sealing structure. Moreover, the chamber 210 is grounded for the film forming apparatus 200.

The exhaust part 220 vacuum-exhausts the inside of the chamber 210. The exhaust part 220 connects to the chamber 210 through the exhaust port 212, and uses a combination of a rough exhaust system and a high vacuum exhaust system. A type of a pump and exhaust velocity for the exhaust part 220 are designed according to the characteristics of the processing material, characteristics demanded for the film, and a processing amount etc.

The substrate holder 230 holds the substrate 105. The substrate holder 230 moves the substrate 105 in various directions according to the substrate shape for the uniform film quality and film thickness. Therefore, the substrate holder 230 uses a method of rotating a flat plate and Carousel type for the film forming of the sputter system for a lens and a wafer, and a method of rotating or planetary rotating a centroclinal holder for the film forming of the evaporation system.

The film thickness meter 240 measures a film thickness. The film thickness meter 240 is monitored by a film thickness system (not shown) to recognize that a necessary film thickness is formed in forming the film. A crystal type film thickness meter is the most general film thickness meter in the chamber 210 for such purposes. A photoelectric type film thickness meter using an interference phenomenon of light is more reproducible than the crystal type film thickness meter for an optical thin film.

The gas introducing mechanism 250 introduces the gas into the chamber 210. The gas introducing mechanism 250 has a target side introducing mechanism 252 and a substrate side introducing mechanism 254, and is connected with the chamber 200 through gas introducing ports 253 and 255. The target side introducing mechanism 252 introduces the gas including one of at least of He, Ar, Kr, Xe, and $H_2$, etc. into the chamber 210. The target side introducing mechanism 252 is arranged on the target 300 side. The substrate side introducing mechanism 254 introduces the gas including one of at least of $F_2$, $O_2$, $N_2$, and $NH_3$, etc. into the chamber 210. The substrate side introducing mechanism 254 is arranged on the optical element (substrate) 100 side.

The shutter 260 is movable between the target 300 and the substrate 105 in the chamber 210, and restricts adhesions of sputtered atoms or molecules to the substrate 105. The shutter 260 defines a shutter speed and a stop etc. based on the film thickness of the substrate 105. The shutter 260 can use various moving methods, such as rotating around a center like a camera, and sliding, and opening and closing.

The shield 270 forms a sputtering gas flow, and prevents the reactive gas from reaching a vicinity of the target. Moreover, the shield 270 may be grounded to stabilize the DC discharge. The shield 270 may be used to limit the generated magnetic field and to suppress the extension of the plasma. The shield 270 is arranged in the chamber 210, and covers the surroundings of the target 300. Various modifications of a material, a height, a range, etc. of the shield 270 are available as long as the above function can be achieved. For example, the shield 270 can use a magnetic material with a high magnetic permeability or a superconductivity material.

The driving part 280 drives the shutter 260 based on the desired opening and closing speed and the stop. The driving part 280 defines a driving mechanism according to the shape of the shutter 260. Moreover, the driving part 280 adjusts the substrate holder 230 so that the substrate holder 230 opposes to the target 300.

The power supply part 285 generates the plasma to sputter the target 300. The power supply part 285 applies a high negative DC voltage of plural hundreds to plural thousands V to the target 300 for discharge. The instant embodiment uses a DC discharge. The DC discharge has an effect that can extremely reduce the plasma density near the substrate, can reduce a damage to the film in forming a film, and can form a film with a low light absorption.

The controller 290 controls the exhaust part 220, the gas introducing mechanism 250, the driving part 280, and the power supply part 285. The controller 290 controls the exhaust part 220 so that the chamber 210 maintains the atmosphere of about 0.1 Pa to plural Pa, and controls the gas introducing mechanism 250 so that an introduced amount of $F_2$ is 10% or less of a total gas flow amount of the chamber 210 including the reactive gas such as $O_2$ and $N_2$ etc. in forming the first thin film 110. Thereby, the formed first thin film 110 contains fluorine of 15% or less in the entire film including oxide or nitride etc., and has a film absorption factor of 0.2% or less per a film thickness of 100 nm to a light with a wavelength of approximately 193 nm. As a result, the substrate 110 that has the first thin film 110 can prevent the reduced optical performance such as reflection, due to film is peeling off etc.

In addition, the controller 290 controls the driving part 280 so that the thickness a of the first thin film 110 is 2 nm or more, maintaining a good adhesion between the substrate 105 and the second thin film 120. As a result, the substrate 110 that has the first thin film 110 can prevent the reduced optical performance such as reflection, due to film is peeling off etc. Moreover, the controller 290 controls the power supply part 285 to apply high negative DC voltage of plural kV to the target 300.

The target 300 is replaceable, and discharges atoms or molecules by sputtering. The target 300 uses a conductive target that provides the DC discharges during the film forming. In that case, the material of the target can be properly changed, and may use a metallic material such as Mg, La, Al, and Nd etc.

Figure 3:
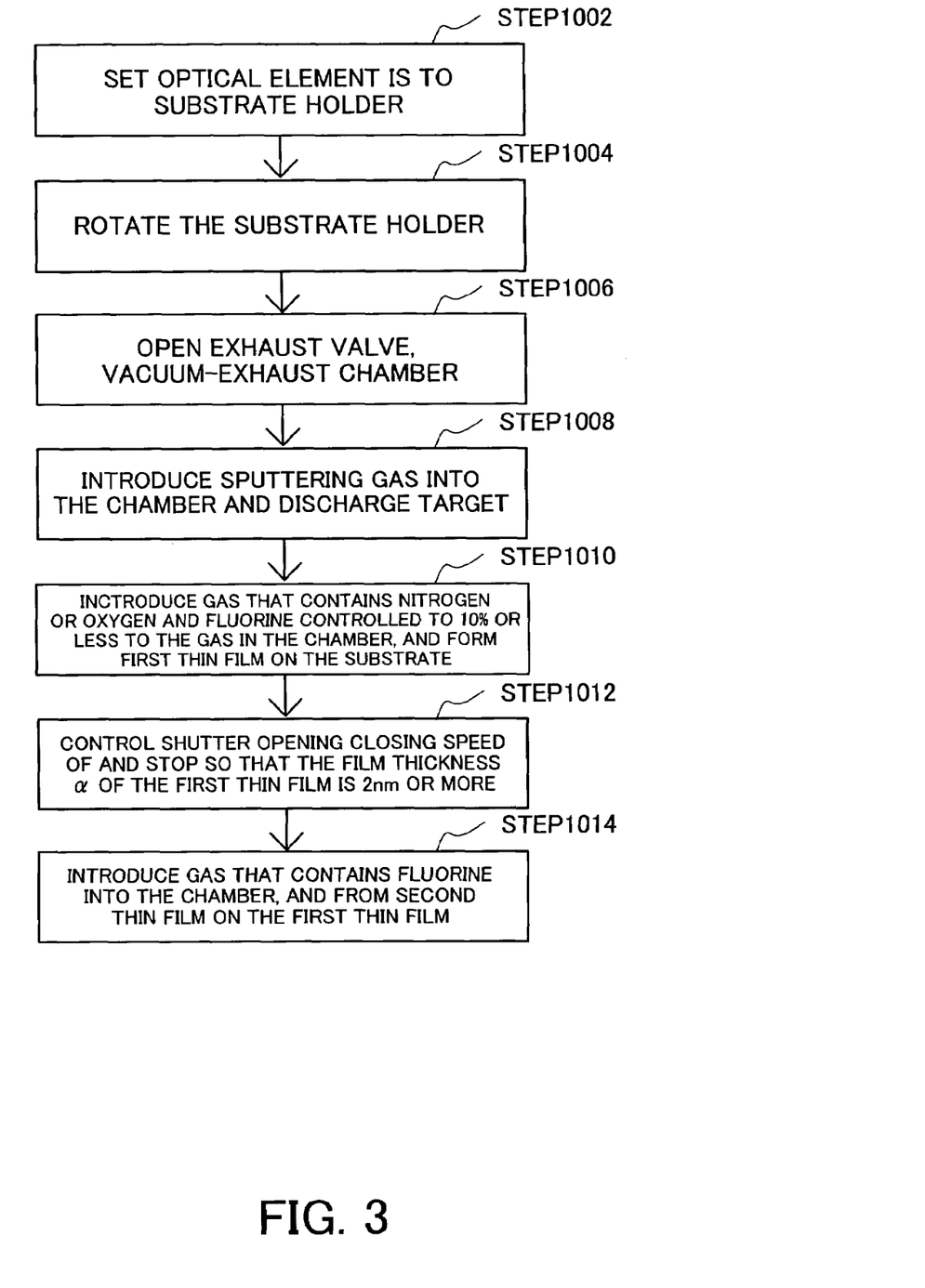
FIG. 3 is a flowchart for explaining a film forming method using the film forming apparatus shown in FIG. 2.

Referring to FIG. 3, a description will be given of a film forming method of the optical element 100 that has the first thin film 110 and the second thin film 120. Here, FIG. 3 is a flowchart for explaining the film forming method.

The sputter vapor deposition method applies several hundreds voltages between the optical element (substrate) and the target in the inert gas atmosphere, causes a low-pressure gas discharge (glow discharge), accelerates an ionized inert gas toward the target, and deposits a metal of the dispersed target and compound onto the surface of the optical element (substrate).

First, the substrate 105 is set to the substrate holder 230 as the target in the chamber 210 of the film forming apparatus 200 (step 1002). The target may use a metallic material, such as Mg, La, Al and Nd, and the substrate 105 may use a material, such as quartz glass and calcium fluoride. The driving part 280 adjusts the substrate holder 230 so that the substrate holder 230 opposes to the target 300. For example, the substrate holder 230 starts rotating at 60 rpm (step 1004). An exhaust valve (not shown) opens and the exhaust part 220 drives, so that a gas pressure of the chamber 210 is exhausted to the vacuum of $1\times10^{-6}$ Torr or less (step 1006). Then, the target side introducing mechanism 252 introduces the sputtering gas into the chamber 210 through the gas introducing port 253, and the target 300 discharges (step 1008). The sputtering gas may use such a material as He, Ar, Kr and Xe.

The gas that contains nitrogen or oxygen and fluorine controlled to 10% or less of the gas in the chamber 210 is introduced into the chamber 210 that accommodates the substrate 105, and the first thin film 110 is formed on the substrate 105 (step 1010). The gas that contains nitrogen or oxygen uses $O_2$, $N_2$ and $NH_3$ etc., and is introduced into the chamber 210 by the substrate side introducing mechanism 254 through the gas introducing port 255. The controller 290 controls the opening and closing speed of the shutter 260 and the aperture stop etc. so that the film thickness α of the first thin film 110 is 2 nm or more (step 1012). Moreover, the controller 290 controls the exhaust part 220, the gas introducing mechanism 250, the driving part 280, the power supply part 285, a cooling mechanism (not shown) so that a temperature of the first thin film 110 is 50° C. or less. When the first thin film 110 becomes the film thickness α of 2 nm or more, the target 300 in the chamber 210 is exchanged, and the gas that contains nitrogen or oxygen is exhausted. Then, the gas that contains fluorine is introduced into the chamber 210, and the second thin film 120 is formed on the first thin film 110 (step 1014). Thereby, the second thin film 120 is formed. According to the film forming method, the material that contains oxide or nitride does not generate the fluorine or hydrogen plasma during the film forming process, or does not etch the surface of the substrate 105, maintaining the surface of the substrate 105 smooth. A good adhesion is maintained between the substrate 105 and the first thin film 110 formed on the surface of the substrate 105, and the first thin film 110 does not easily peel off from the substrate 105. In addition, the fluorine gas reduces the film absorption factor. Therefore, the film absorption factor of the first thin film 110 for the light with a wavelength of approximately can be 0.2% or less per the film thickness of 100 nm. As a result, the substrate 105 that has the first thin film 110 can prevent the reduced optical performance such as reflection, due to film is peeling off etc.

Referring to Table 1, a description will be given of an example of the film forming method.

Moreover, the film forming method of the condition 3 introduces $F_2$ so that $F_2$/total gas flow amount>0.2, uses Mg as the target material of a second thin film and forms a $MgF_2$ film, uses La as the target material of a third thin film and forms a $LaF_2$ film, and uses Mg as the target material of a fourth thin film and forms a $MgF_2$ film.

The film forming method of the condition 4 uses three kinds of targets, i.e., Al, Mg, and La as targets 300. The film

TABLE 1

| CONDITION 1 | MULTILAYER FILM STRUCTURE (W/DOUBLE-SIDED AR COATINGS) | $MgF2$ | $LaF3$ | $MgF2$ | | WIPE, TAPE TEST | FILM ABSORPTION FACTOR |
|---|---|---|---|---|---|---|---|
| | RATIO OF $F_2$ TO TOTAL PROCESS GAS FLOW AMOUNT | >0.2 | >0.2 | >0.2 | | EXFOLIATION | <0.20%/ 2 SURFACES |
| CONDITION 2 | MULTILAYER FILM STRUCTURE (W/DOUBLE-SIDED AR COATINGS) | $MgF2$ | $LaF3$ | $MgF2$ | | WIPE, TAPE TEST | FILM ABSORPTION FACTOR |
| | RATIO OF $F_2$ TO TOTAL PROCESS GAS FLOW AMOUNT | <0.1 | >0.2 | >0.2 | | ADHESION: EXCELLENT | 0.60%/ 2 SURFACES |
| CONDITION 3 | MULTILAYER FILM STRUCTURE (W/DOUBLE-SIDED AR COATINGS) | $F_2$-DOPED MgO | $MgF2$ | $LaF3$ | $MgF2$ | WIPE, TAPE TEST | FILM ABSORPTION FACTOR |
| | RATIO OF $F_2$ TO TOTAL PROCESS GAS FLOW AMOUNT | <0.05 | >0.2 | >0.2 | >0.2 | ADHESION: EXCELLENT | <0.20%/ 2 SURFACES |
| CONDITION 4 | MULTILAYER FILM STRUCTURE (W/DOUBLE-SIDED AR COATINGS) | $F_2$-DOPED Al2O3 | $MgF2$ | $LaF3$ | $MgF2$ | WIPE, TAPE TEST | FILM ABSORPTION FACTOR |
| | RATIO OF $F_2$ TO TOTAL PROCESS GAS FLOW AMOUNT | <0.05 | >0.2 | >0.2 | >0.2 | ADHESION: EXCELLENT | <0.20%/ 2 SURFACES |

EXAMPLE

First, the film forming method is classified into Conditions 1 to 4, and the adhesion of the optical element (substrate) 100 and the second thin film 120 and the film absorption factor of the thin film are measured. The film forming apparatus 200 uses an apparatus that can switch Mg and La targets 300 in a chamber. The target is water-cooled. The shield 270 extends by 40 mm in a perpendicular direction to the substrate side from the surface of the target 300. The optical element (substrate) 100 is made of $SiO_2$.

The film forming method of the condition 1 uses Mg as a target material of a first thin film, introduces Ar through the gas introducing port 253, and introduces $F_2$ through the gas introducing port 255 so that $F_2$/total gas flow amount>0.2. Moreover, the film forming method of the condition 1 introduces $F_2$ so that $F_2$/total gas flow amount>0.2, uses La as the target material of a second thin film and forms a $LaF_2$ film, and uses Mg as the target material of a third thin film and forms a $MgF_2$ film.

The film forming method of the condition 2 uses Mg as the target material of a first thin film, introduces Ar through the gas introducing port 253, and introduces $F_2$ through the gas introducing port 255 so that $F_2$/total gas flow amount<0.1. Moreover, the film forming method of the condition 2 introduces $F_2$ so that $F_2$/total gas flow amount>0.2, uses La as the target material of a second thin film and forms a $LaF_2$ film, and uses Mg as the target material of a third thin film and forms a $MgF_2$ film.

The film forming method of the condition 3 uses Mg as the target material of a first thin film, introduces Ar through the gas introducing port 253, and introduces $O_2$ with enough amount to decrease film absorption and $F_2$ so that $F_2$/total gas flow amount<0.05 through the gas introducing port 255.

forming method of the condition 4 uses Al as the target material of a first thin film, introduces Ar through the gas introducing port 253, and introduces $O_2$ with enough amount to decrease film absorption and $F_2$ so that $F_2$/total gas flow amount<0.05 through the gas introducing port 255. Moreover, the film forming method of the condition 4 introduces $F_2$ so that $F_2$/total gas flow amount>0.2, uses Mg as the target material of a second thin film and forms $MgF_2$ film, uses La as the target material of a third thin film and forms a $LaF_2$ film, and uses Mg as the target material of a fourth thin film and forms a $MgF_2$ film.

According to the result of these measurements, the condition 1 has a problem of a bad adhesion of the film and the substrate, but exhibits the excellent film absorption. Since the condition 2 reduces the $F_2$ density in the film forming process of fluoride material layer of thin film, and has an excellent film adhesion but an increased film absorption factor. On the other hand, the conditions 3 and 4 dope fluorine to the first thin film 110, reduce the $F_2$ density in the film forming process of the first thin film 110, and exhibit the excellent adhesion of the second thin film 120 and the optical element (substrate) 100 and the excellent film absorption factor. As a result, the second thin film 120 is prevented from peeled off from the substrate 105 that has the first thin film 110, reducing the exchange frequency for a new substrate 105, and improving the throughput and the productivity. The first thin film 110 properly adheres to the substrate 105, improves the throughput.

Figure 4:
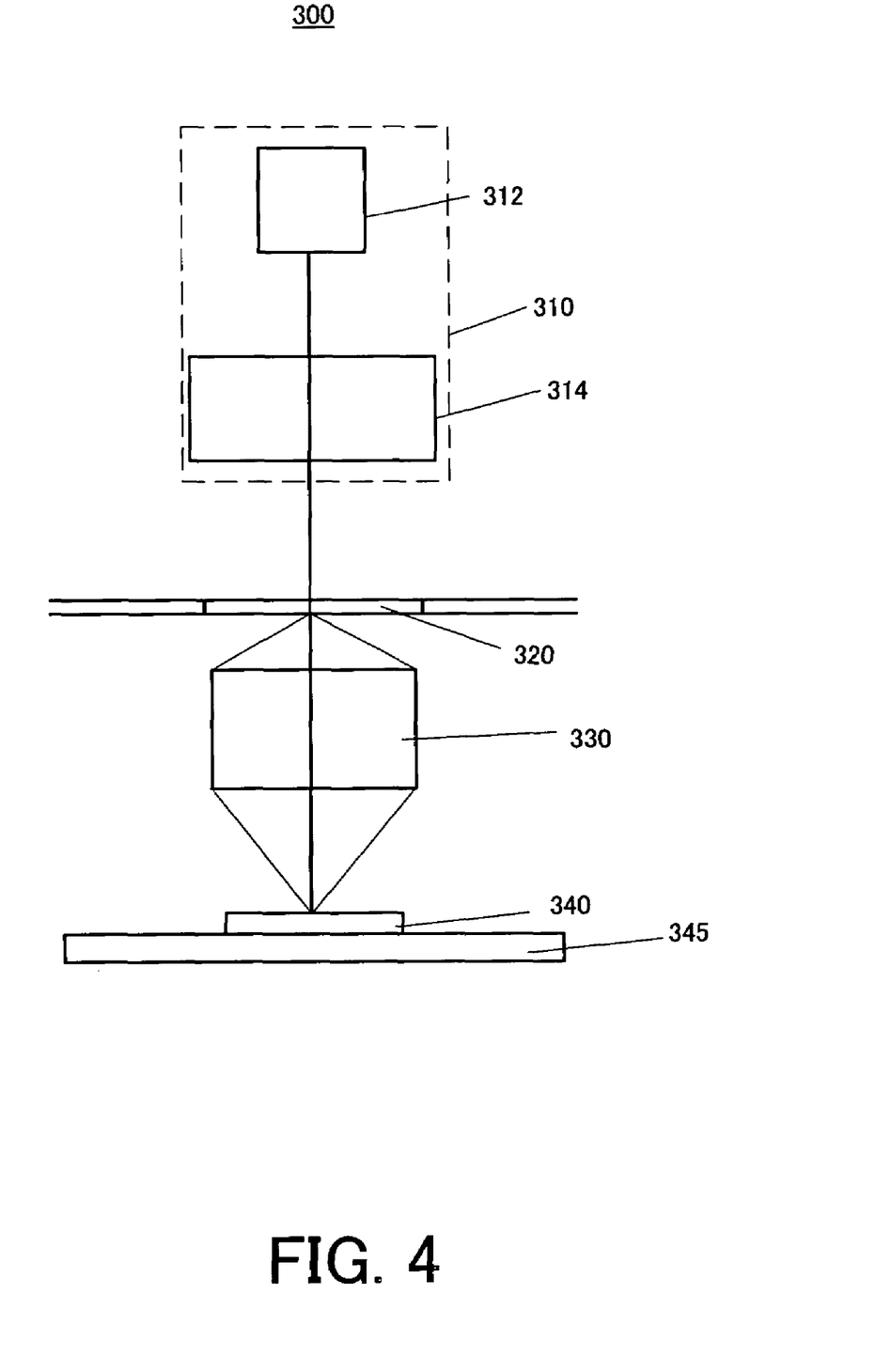
FIG. 4 is a schematic block diagram of an exposure apparatus that has the optical element shown in FIG. 1.

Referring to FIG. 4, a description will be given of an exposure apparatus 300 as one example of an optical apparatus that has an optical element that has the first thin film of the present invention. However, the optical apparatus that has the optical element that has the first thin film of the present invention is not limited to the exposure apparatus, and is applicable to a spectroscope, a spectrophotometer, and a photometry apparatus, etc.

FIG. 4 is a schematic block diagram of the exposure apparatus 300. The exposure apparatus 300 includes, as shown in FIG. 4, an illumination apparatus 310 for illuminating a reticle (or a mask) 320 which has a circuit pattern, a stage 345 for supporting a plate 340, and a projection optical system 330 that projects diffracted light created from the illuminated reticle pattern onto a plate 340.

The exposure apparatus 300 is a projection exposure apparatus that exposes onto the plate 340 a circuit pattern created on the reticle 320, e.g., in a step-and-repeat or a step-and-scan manner. Such an exposure apparatus is suitable for a sub-micron or quarter-micron lithography process. This embodiment exemplarily describes a step-and-scan exposure apparatus (which is also called "a scanner"). The "step-and-scan manner", as used herein, is an exposure method that exposes a reticle pattern onto a wafer by continuously scanning the wafer relative to the reticle, and by moving, after an exposure shot, the wafer stepwise to the next exposure area to be shot. The "step-and-repeat manner" is another mode of exposure method that moves a wafer stepwise to an exposure area for the next shot, for every cell projection shot.

The illumination apparatus 310 illuminates the reticle 320 that has a circuit pattern to be transferred, and includes a light source unit 312 and an illumination optical system 314.

As an example, the light source unit 312 uses a light source such as an ArF excimer laser with a wavelength of approximately 193 nm and a KrF excimer laser with a wavelength of approximately 248 nm. However, the laser type is not limited to the excimer lasers because for example and a $F_2$ laser with a wavelength of approximately 157 nm may be used. Similarly, the number of laser units is not limited. When the light source unit 312 uses laser, it is desirable to employ a beam shaping optical system that shapes a parallel beam from a laser source to a desired beam shape, and an incoherently turning optical system that turns a coherent laser beam into an incoherent one. A light source applicable for the light source unit 312 is not limited to a laser, and may use one or more lamps such as a mercury lamp and a xenon lamp.

The illumination optical system 314 is an optical system that illuminates the reticle 320, and includes a lens, a mirror, a light integrator, a stop, and the like, for example, a condenser lens, a fly-eye lens, an aperture stop, a condenser lens, a slit, and an image-forming optical system in this order. The illumination optical system 314 can use any light regardless of whether it is axial or non-axial light. The light integrator may include a fly-eye lens or an integrator formed by stacking two sets of cylindrical lens array plates (or lenticular lenses), and can be replaced with an optical rod or a diffractive element. The inventive optical element applied the first thin film and the second thin film is applicable to optical elements, such as, a lens in the illumination optical system 314.

The reticle 320 is made, for example, of quartz, has a circuit pattern (or an image) to be transferred, and is supported and driven by a reticle stage (not shown). The diffracted light emitted from the reticle 320 passes the projection optical system 330 and is then projected onto the plate 340. The reticle 320 and the plate 340 are located in an optically conjugate relationship. Since the exposure apparatus 300 of this embodiment is a scanner, the reticle 320 and the plate 340 are scanned at the speed ratio of the reduction ratio of the projection optical system 330, thus transferring the pattern from the reticle 320 to the plate 340. If it is a step-and-repeat exposure apparatus (referred to as a "stepper"), the reticle 320 and the plate 340 remains still when exposing the mask pattern.

The projection optical system 330 is an optical system that projects light that reflects a pattern on the reticle 320 located on an object surface onto the plate 340 located on an image surface. The projection optical system 330 may use an optical system comprising solely of a plurality of lens elements, an optical system including a plurality of lens elements and at least one concave mirror (a catadioptric optical system), an optical system including a plurality of lens elements and at least one diffractive optical element such as a kinoform, a full mirror type optical system, and so on. Any necessary correction of the chromatic aberration may be accomplished by using a plurality of lens units made from glass materials having different dispersion values (Abbe values) or arranging a diffractive optical element such that it disperses light in a direction opposite to that of the lens unit. The inventive optical element that has the first thin film and the second thin film is applicable to a lens in the projection optical system 330.

The plate 340, such as a wafer and a LCD, is an exemplary object to be exposed. Photoresist is applied to the plate 340. A photoresist application step includes a pretreatment, an adhesion accelerator application treatment, a photo-resist application treatment, and a pre-bake treatment. The pretreatment includes cleaning, drying, etc. The adhesion accelerator application treatment is a surface reforming process to enhance the adhesion between the photoresist and a base (i.e., a process to increase the hydrophobicity by applying a surface active agent), through a coat or vaporous process using an organic coating such as HMDS (Hexamethyl-disilazane). The pre-bake treatment is a baking (or burning) step, which makes the photoresist softer than after development and removes the solvent.

The stage 345 supports the plate 340. The stage 345 may use any structure known in the art, thus, a detailed description of its structure and operation is omitted. The stage 345 may use, for example, a linear motor to move the plate 340 in the XY directions. The reticle 320 and plate 340 are, for example, scanned synchronously, and the positions of the stage 345 and a mask stage (not shown) are monitored, for example, by a laser interferometer and the like, so that both are driven at a constant speed ratio. The stage 345 is installed on a stage stool supported on the floor and the like, for example, via a dampener. The mask stage and the projection optical system 330 are installed on a lens barrel stool (not shown) support, for example, via a dampener, to the base frame placed on the floor.

In exposure, light is emitted from the light source 312, e.g., Koehler-illuminates the reticle 320 via the illumination optical system 314. Light that passes through the reticle 320 and reflects the mask pattern is imaged onto the plate 340 by the projection optical system 330. The illumination and projection optical systems 314 and 330 in the exposure apparatus 300 include the optical element applied the first thin film and the second thin film of the present invention. Therefore, the exposure apparatus 300 prevents the exfoliation the second thin film 120 and the substrate 105, decrease the frequency to exchange for a new substrate 105, improve the throughput, and increase the productivity. Moreover, the exposure apparatus 300 prevents the deterioration of the optical performance by the exfoliation of the film, and can decrease the light intensity loss. As a result, the exposure apparatus 300 provide high-quality devices (such as semiconductor devices, LCD devices, photographing devices (such as CCDs, etc.), thin film magnetic heads, and the like) with high throughput and economic efficiency.

Figure 5:
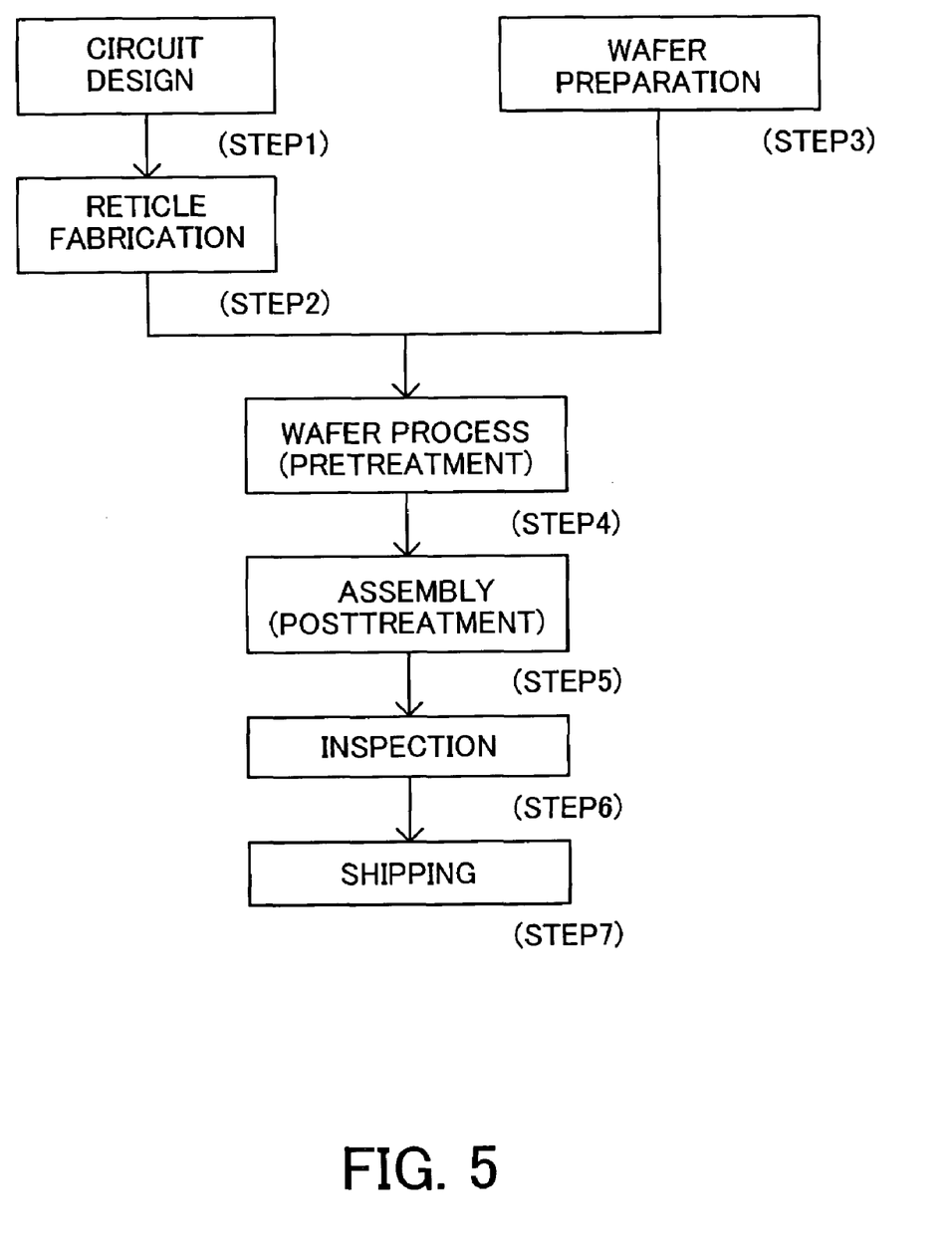
FIG. 5 is a flowchart for explaining how to fabricate devices (such as semiconductor chips such as ICs, LCDs, CCDs, and the like).
Figure 6:
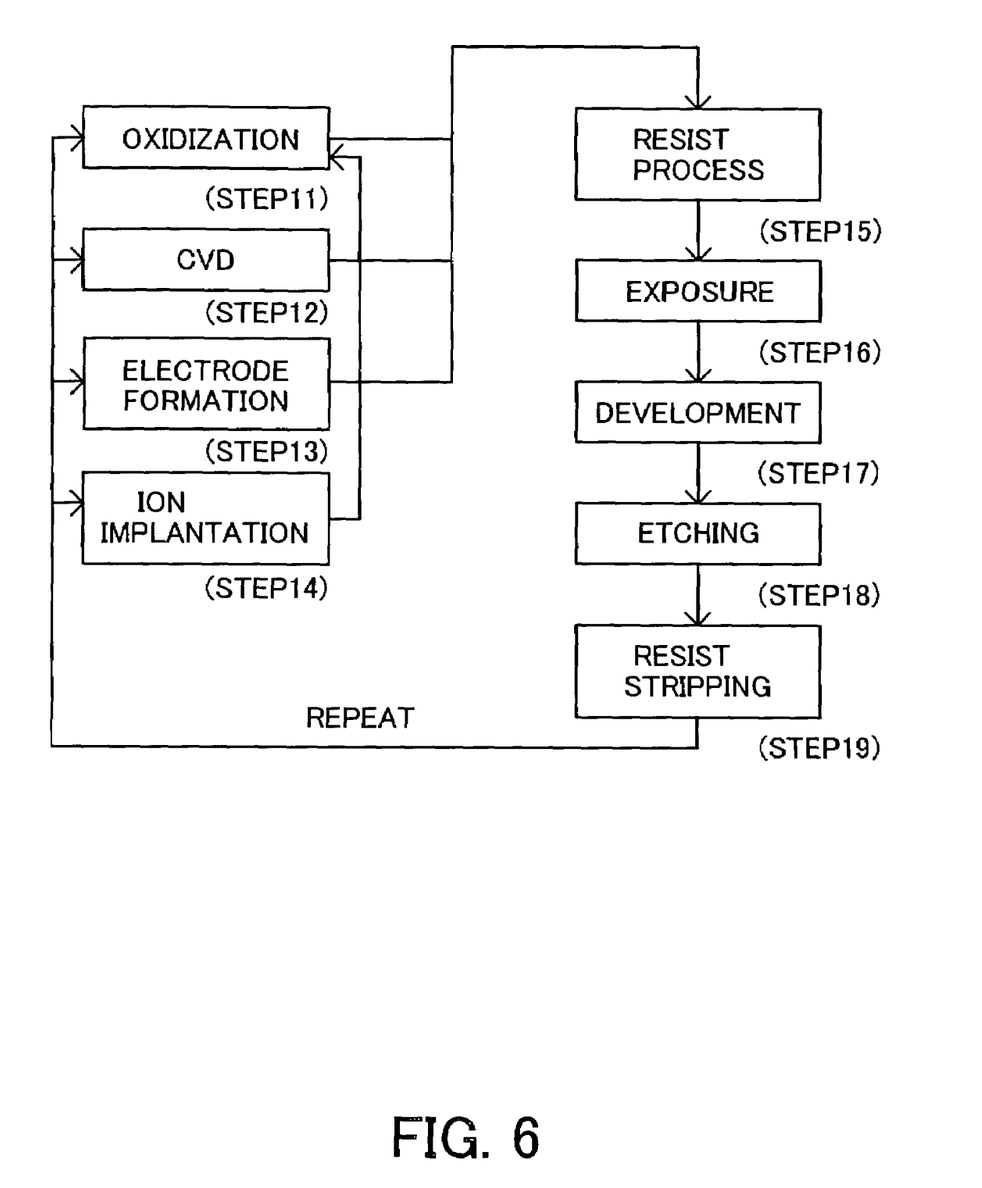
FIG. 6 is a detailed flowchart of a wafer process in step 4 in FIG. 5.

Referring now to FIGS. 5 and 6, a description will be given of an embodiment of a device manufacturing method using the above mentioned exposure apparatus 300. FIG. 5 is a flowchart for explaining how to fabricate devices (i.e., semiconductor chips such as IC and LSI, LCDs, CCDs, and the like). Here, a description will be given of the fabrication of a semiconductor chip as an example. Step 1 (circuit design) designs a semiconductor device circuit. Step 2 (reticle fabrication) forms a reticle having a designed circuit pattern. Step 3 (wafer preparation) manufactures a wafer using materials such as silicon. Step 4 (wafer process), which is also referred to as a pretreatment, forms the actual circuitry on the wafer through lithography using the reticle and wafer. Step 5 (assembly), which is also referred to as a post-treatment, forms into a semiconductor chip the wafer formed in Step 4 and includes an assembly step (e.g., dicing, bonding), a packaging step (chip sealing), and the like. Step 6 (inspection) performs various tests on the semiconductor device made in Step 5, such as a validity test and a durability test. Through these steps, a semiconductor device is finished and shipped (Step 7).

FIG. 6 is a detailed flowchart of the wafer process in Step 4. Step 11 (oxidation) oxidizes the wafer's surface. Step 12 (CVD) forms an insulating layer on the wafer's surface. Step 13 (electrode formation) forms electrodes on the wafer by vapor disposition and the like. Step 14 (ion implantation) implants ions into the wafer. Step 15 (resist process) applies a photosensitive material onto the wafer. Step 16 (exposure) uses the exposure apparatus 300 to expose a circuit pattern from the reticle onto the wafer. Step 17 (development) develops the exposed wafer. Step 18 (etching) etches parts other than a developed resist image. Step 19 (resist stripping) removes unused resist after etching. These steps are repeated to form multi-layer circuit patterns on the wafer. Use of the fabrication method in this embodiment helps fabricate higher-quality devices than conventional methods. Thus, the device fabrication method using the exposure apparatus 300, and resultant devices constitute one aspect of the present invention.

Thus, the present invention provides an optical element that improves both of the resolution and the productivity, an optical apparatus, a film forming method, a film forming apparatus, and a device manufacturing method.

Furthermore, the present invention is not limited to these preferred embodiments and various variations and modifications may be made without departing from the scope of the present invention.

This application claims a foreign priority benefit based on Japanese Patent Applications No. 2004-166290, filed on Jun. 3, 2004, which is hereby incorporated by reference herein in its entirety as if fully set forth herein.

What is claimed is:

1. An optical element comprising:
   a multilayer film; and
   a substrate,
   wherein said multilayer film includes:
   a first thin film that is formed on said substrate, and made of fluorine-doped oxide or nitride; and
   a second thin film that is formed on the first thin film, and made of a fluoride material,
   wherein the first thin film has a film absorption factor of 0.2% or less per a film thickness of 100 nm for a light with a wavelength of approximately 193 nm.

2. An optical element according to claim 1, wherein the first thin film is formed while a temperature of the substrate is maintained at 50° C. or less.

3. An optical element according to claim 1, wherein the first thin film contains fluorine of 15% or less of an abundance ratio.

4. An optical element according to claim 1, wherein the first thin film has a thickness of 2 nm or more.

5. An optical apparatus comprising an optical element according to claim 1.

6. An optical apparatus according to claim 5, wherein the optical apparatus is an exposure apparatus, a spectroscope, a spectrophotometer, or a photometry apparatus.

7. An exposure apparatus for using a light with a wavelength of 400 nm or less as an exposure light, the exposure apparatus comprising an optical element according to claim 1.

8. A device manufacturing method comprising the steps of:
   exposing an object using an exposure apparatus; and
   performing a development process for the object exposed,
      wherein the exposure apparatus uses a light with a wavelength of 400 nm or less as an exposure light, and includes an optical element according to claim 1.

9. An optical element comprising:
   a multilayer film; and
   a substrate,
   wherein said multilayer film includes:
   a first thin film that is formed on said substrate, and made of fluorine-doped oxide or nitride; and
   a second thin film that is formed on the first thin film, and made of a fluoride material,
   wherein the first thin film is selected from the group consisting aluminum oxide ($Al_2O_3$), magnesium oxide (MgO), lanthanum oxide ($La_2O_3$), neodymium oxide ($Nd_2O_3$), yttrium oxide ($Y_2O_3$), aluminum nitride (AlN), silicon nitride ($Si_3N_4$), titanium oxide ($TiO_2$), and tantalum oxide ($Ta_2O_5$),
   wherein the second thin film is selected from the group consisting magnesium fluoride ($MgF_2$), aluminum fluoride (AlF3), gadolinium fluoride ($GdF_3$), yttrium fluoride ($YF_3$), lanthanum fluoride ($LaF_3$), neodymium fluoride ($NdF_3$), lead fluoride ($PbF_2$), and strontium fluoride ($SrF_2$).

10. An optical element according to claim 9, wherein the first thin film is formed while a temperature of the substrate is maintained at 50° C. or less.

11. An optical element according to claim 9, wherein the first thin film contains fluorine of 15% or less of an abundance ratio.

12. An optical element according to claim 9, wherein the first thin film has a thickness of 2 nm or more.

13. An optical apparatus comprising an optical element according to claim 9.

14. An optical apparatus according to claim 13, wherein the optical apparatus is an exposure apparatus, a spectroscope, a spectrophotometer, or a photometry apparatus.

15. An exposure apparatus for using a light with a wavelength of 400 nm or less as an exposure light, the exposure apparatus comprising an optical element according to claim 9.

16. A device manufacturing method comprising the steps of:
   exposing an object using an exposure apparatus; and
   performing a development process for the object exposed,
      wherein the exposure apparatus uses a light with a wavelength of 400 nm or less as an exposure light, and includes an optical element according to claim 9.

* * * * *